Dec. 20, 1966　　　H. JACOBY　　　3,292,466
DRIVING ARRANGEMENT FOR MULTIPLE-SPINDLE MACHINE TOOLS
Filed July 21, 1964　　　2 Sheets-Sheet 1
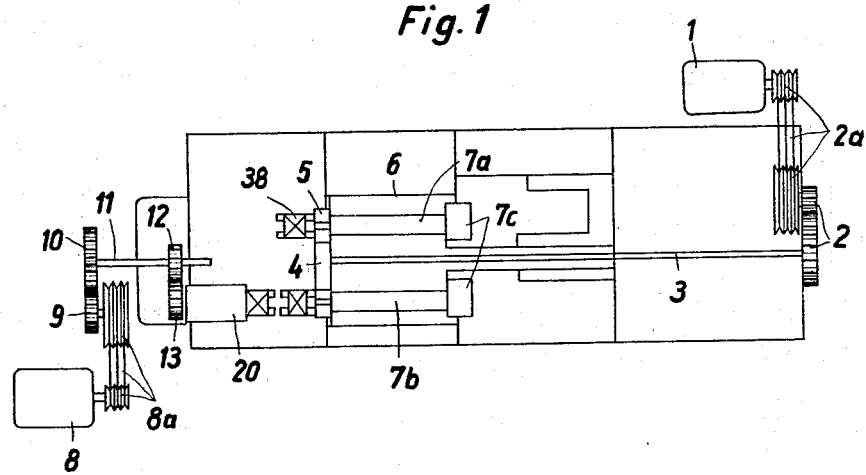
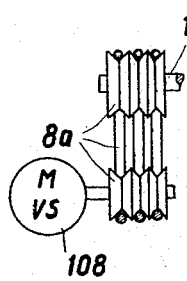
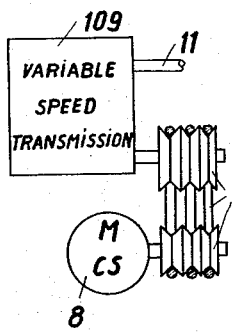
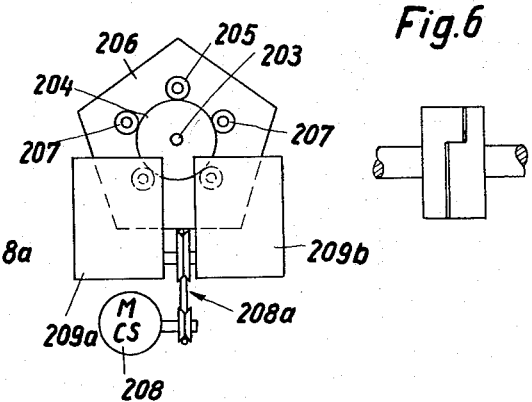
Inventor:
HANS JACOBY
BY Michael J. Striker
his ATTORNEY Dec. 20, 1966         H. JACOBY         3,292,466
DRIVING ARRANGEMENT FOR MULTIPLE-SPINDLE MACHINE TOOLS
Filed July 21, 1964                    2 Sheets-Sheet 2

Inventor:
HANS JACOBY
BY
his ATTORNEY

United States Patent Office 3,292,466
Patented Dec. 20, 1966

3,292,466
DRIVING ARRANGEMENT FOR MULTIPLE-SPINDLE MACHINE TOOLS
Hans Jacoby, Bielefeld, Germany, assignor to Gildemeister & Company, AG., Bielefeld, Germany
Filed July 21, 1964, Ser. No. 384,196
Claims priority, application Germany, July 24, 1963,
W 34,946
12 Claims. (Cl. 82—29)

The present invention relates to mutiple-spindle automatic lathes and similar machine tools. More particularly, the invention relates to an improved driving arrangement for the spindles in such machine tools.

It is well known that certain types of complicated work performed by multiple-spindle chucking automatics and similar machine tools require that the work spindles be driven at different speeds. In such automatics, the work spindles are normally mounted in a turret-like carrier and are driven by a centrally located main shaft. In accordance with a known proposal, the work spindles may be driven at different speeds by providing the main shaft with a series of sun gears and by providing each work spindle with an equal number of planet pinions whereby each pinion meshes with a different sun gear and each pinion may be coupled to the corresponding work spindle by a suitable clutch so that, depending on which of the clutches is operative, each work spindle may be driven at a selected speed. A serious drawback of such driving arrangements is that the rotational speed of each work spindle invariably depends on the rotational speed of the main shaft, that the spindles must be rather long which reduces their stiffness and accuracy of machining, that the various gears, pinions and clutches occupy too much room, and that such component parts add considerably to the initial and maintenance cost of the machine tool.

Accordingly, it is an important object of the present invention to provide a simple, compact, comparatively inexpensive and highly accurate driving arrangement which may be utilized to drive all spindles of a multiple-spindle automatic at the same speed and which comprises one or more novel driving units serving to drive any selected spindle at one or more different speeds.

Another object of the invention is to provide a driving arrangement wherein a single driving unit will suffice to drive any selected work spindle of a multiple-spindle chucking automatic at any desired speed.

A further object of the invention is to provide a driving arrangement which is constructed and assembled in such a way that any selected work spindle may be automatically disengaged from the drive means which is common to all spindles and is automatically coupled to a novel driving unit, or vice versa, when such selected spindle is indexed to a predetermined spatial position.

An additional object of the invention is to provide an improved driving unit which may be utilized in a driving arrangement of the above outlined characteristics and to construct the driving unit in such a way that the rotational speed of any selected spindle may be changed while the machine tool is in actual use.

A concomitant object of the invention is to provide a driving arrangement which allows for gradual acceleration of a selected work spindle to full operating speed.

Still another object of the invention is to provide a driving arrangement which necessitates negligible lengthening of the work spindles so that such spindles may resist substantial bending and other stresses.

Another object of my invention is to provide a driving arrangement whose operation may be fully synchronized with the operation of certain other assemblies in a multiple-spindle automatic and which is constructed in such a way that very high driving torque may be transmitted to any selected spindle without any slippage so that the automatic may be utilized for treatment of large workpieces and for removal of comparatively thick shavings, chips or the like.

A concomitant object of the invention is to provide a driving arrangement which is capable of transmitting to one, two or more work spindles a driving torque exceeding substantially such torque as can be transmitted by the drive means which is common to all spindles of a multiple-spindle machine tool.

With the above objects in view, one feature of the present invention resides in the provision of a multiple-spindle machine tool which comprises a frame, an indexible carrier mounted in the frame to rotate about a fixed first axis, spindles mounted in the carrier and each arranged to rotate about a second axis (i.e., about its own axis) which is parallel with the fixed axis, drive means for rotating the spindles about the second axes and comprising change-speed means and meshing gears mounted for rotation about the first and second axes, releasable first clutch means for normally coupling the spindles to the drive means, and at least one separate driving unit for rotating the spindles seriatim about the respective second axes independently of the drive means. In accordance with a preferred embodiment of my invention, each driving unit is stationary and may comprise an output shaft arranged to rotate about a third axis which is parallel to and coincides with the axes of consecutive spindles during intervals between consecutive indexing movements of the carrier, a motor or an analogous prime mover for driving the output shaft, second clutch means for coupling the output shaft to consecutive spindles in corresponding angular positions of the carrier, and disengaging means for releasing the first clutch means in such angular positions of the carrier so that the corresponding spindles may be coupled to the output shaft.

The carrier may support five, eight or more work spindles whose axes are equidistant from the fixed axis so that each spindle may be moved in registry with the output shaft to be driven at a speed corresponding to the speed which is selected by the driving unit. The output shaft may be rotated by a variable speed electric motor, by a constant speed motor through a variable speed transmission, or by a constant speed motor through a set of change-speed gears which may be replaced by a different set whenever the rotational speed of a given spindle should be changed.

If desired, the machine tool may comprise only one, two but also more driving units each of which may drive one of a series of work spindles so that two, three or even more spindles may be driven simultaneously but at different speeds and independently of the drive means which is common to all spindles. The number of driving units is less than the total number of spindles.

The novel features which are considered as characteristic of the invention are set forth in particular in the appended claims. The improved driving arrangement itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic side elevational view of a multiple-spindle machine tool which is provided with a driving arrangement embodying one form of the present invention;

FIG. 3 is a somewhat schematic side elevational view of an infinitely variable speed transmission which may be utilized as a substitute for certain component parts of the driving unit shown in FIGS. 1 and 2;

FIG. 4 is a similar schematic side elevational view of a variable-speed electric motor which may be used as a substitute for the motor and certain other component parts of the driving unit shown in FIG. 2;

FIG. 5 is a diagrammatic end elevational view of a multiple-spindle machine tool which comprises two driving units to rotate a pair of work spindles independently of the drive means which is common to all work spindles; and FIG. 6 illustrates a modified positive-engagement clutch which may be used in the machine tool of my invention.

Figure 2:
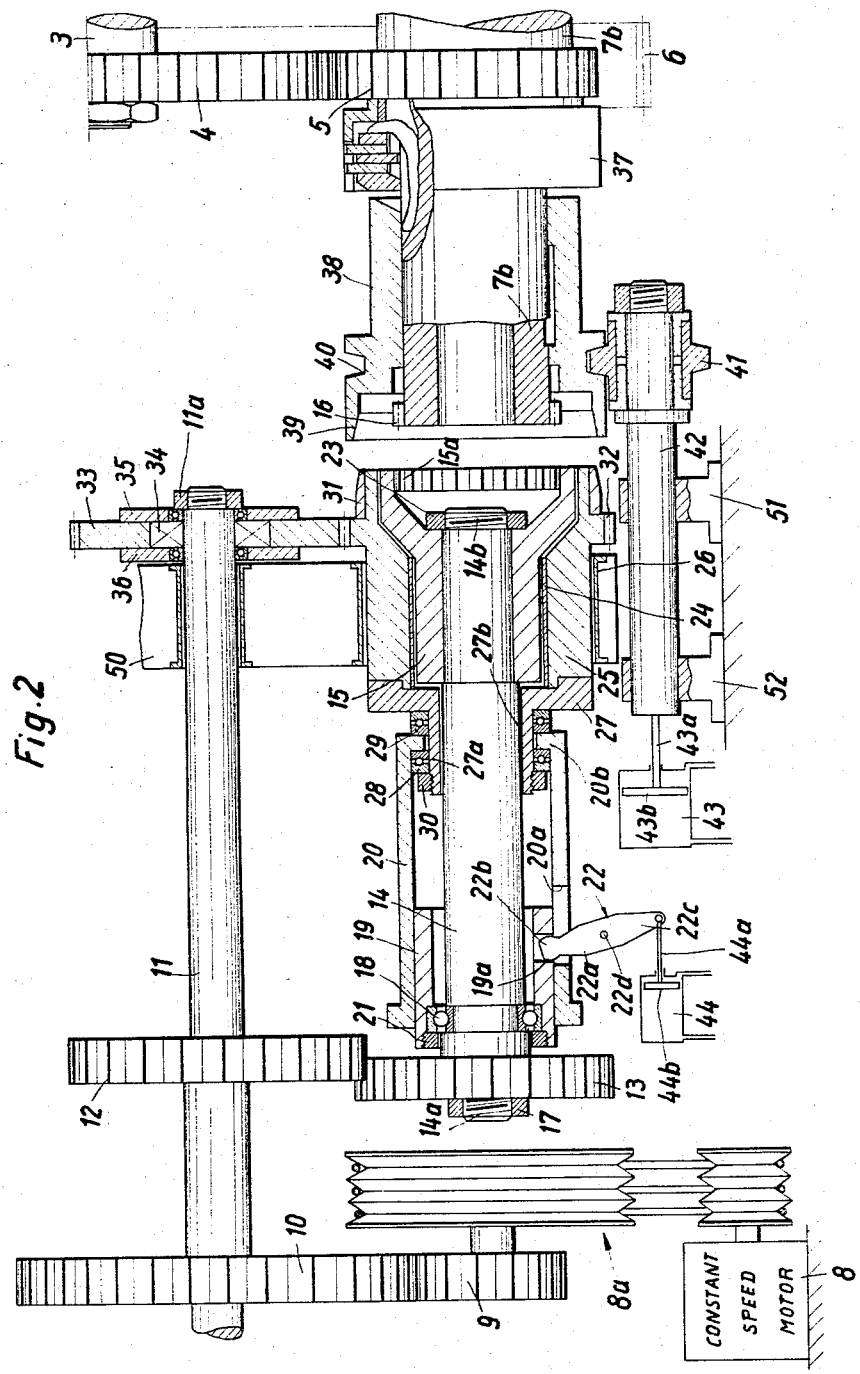
FIG. 2 is an enlarged axial section through the driving unit of the driving arrangement which is shown in FIG. 1.

Referring to FIG. 1, there are shown certain component parts of an automatic multiple-spindle machine tool, for example, a chucking automatic. This machine tool comprises drive means including a first electric motor 1 which drives a main shaft 3 through a system of belts and pulleys 2a and change-speed gears 2. The left-hand end portion of the main shaft 3 extends through a turret-shaped or drum-shaped carrier 6 supporting a series of parallel work spindles, only two such spindles (7a and 7b) being shown in FIG. 1. The spindles 7a, 7b orbit about the fixed axis of the shaft 3 and are driven to rotate about their own axes by means of a planetary transmission which constitutes an element of the common drive means, this transmission including a sun gear 4 mounted on the main shaft 3 and planet pinions 5 which are mounted on the spindles. The ratio of the planetary transmission including the gear 4 and pinions 5 may be such that the spindles 7a, 7b are rotated at the same speed.

In accordance with the present invention, at least one of the spindles may be rotated at a different speed when the carrier 6 is indexed to a certain angular position. The spindle 7a rotates at the speed determined by the r.p.m. of the main shaft 3, and the spindle 7b normally also rotates at the speed determined by the r.p.m. of the main shaft 3, excepting in that particular angular position of the carrier 6 which is shown in FIGS. 1 and 2. The driving unit which rotates the spindle 7b at such different speed operates independently of the drive means including the motor 1 and automatically disconnects the spindle 7b from the corresponding planet pinion 5 when the spindle 7b is to rotate at different speed. The driving unit comprises a constant-speed electric motor 8 which may drive the spindle 7b through a system of belts and pulleys 8a and a pair of exchangeable change-speed gears 9, 10. The exact construction of this driving unit is shown in FIG. 2.

The gear 10 is mounted on and drives an intermediate shaft 11 which is journalled in a frame member 50 and carries a driver gear 12 meshing with a driven gear 13 mounted at one end of an output shaft 14. The other end of the output shaft 14 carries the female element 15 of a positive-engagement clutch, and this clutch further includes a male clutch element 16 which is mounted on the adjacent end portion of the work spindle 7b. The output shaft 14 comprises a threaded end portion 14a to take a clamping nut 17 which causes the driven gear 13 to bear against the inner race of a radial antifriction bearing 18 mounted on the output shaft 14. The driven gear 13 is in permanent mesh with the driver gear 12, regardless of the axial position of the output shaft 14. The outer race of the radial bearing 18 is mounted in a tubular shifting member 19 and is retained therein by a nut 21. The shifting member 19 is reciprocable but cannot rotate in a sleeve 20 which is fixed to the frame of the machine tool in a manner not shown in FIG. 2. The means for reciprocating the shifting member 19 with reference to the sleeve 20 (and for thereby reciprocating the output shaft 14 with the female clutch element 15) comprises a two-armed lever 22 having a first arm 22a which is provided with a motion-transmitting head 22b extending through an elongated slot 20a in the sleeve 20 and into a cutout 19a in the shifting member 19. The second arm 22c of the lever 22 is articulately connected with the piston rod 44a of a double-acting hydraulic or pneumatic cylinder 44 which may reciprocate a piston 44b so as to rock the lever 22 about a fixed pivot 22d and to thereby move the output shaft 14 axially between a first end position which is shown in FIG. 2 and a second end position in which the internal teeth 15a of the female clutch element 15 mate with external teeth on the male clutch element 16. The output shaft 14 will be moved to such second end position at the time its axis coincides with the axis of the spindle 7b i.e., when the carrier 6 is indexed to a predetermined angular position. The means for connecting the female clutch element 15 to the output shaft 14 comprises a nut 23 which meshes with the right-hand end portion 14b of the output shaft. The clutch element 15 is rotatable in a bronze bearing 24 which is provided along the internal surface of a second male clutch element 25 forming part of a friction clutch which also includes a female clutch element 38 mounted on the spindle 7b. The clutch element 25 is rotatable in a bronze bearing 26 provided in the stationary frame member 50 and this clutch element 25 is rigidly connected with an annular flange 27 surrounding the output shaft 14 and having an annular hub 27a which is provided with a bronze bearing 27b for the median portion of the output shaft. The flange 27 carries two thrust bearings 28, 29 which surround the hub 27a and are separated by an inwardly extending annular collar 20b of the fixed sleeve 20. The races of the bearing 28 are clamped between the collar 20b and a nut 30 which is provided on the hub 27a, and the races of the bearing 29 are clamped between the collar 20b and the flange 27. Thus, the clutch element 25 is free to rotate with or relative to the clutch element 15 but is held against axial movement with the output shaft 14. A portion of the clutch element 25 forms a spur gear 32 whose teeth mate with the teeth of a second driver gear 33 mounted on a free-wheeling clutch 34 of any known design. The sprags, balls or similar motion-transmitting elements of this free-wheeling clutch 34 serve to normally drive the gear 33 in response to rotation of the intermediate shaft 11. The means for retaining the gear 33 in the axial position of FIG. 2 comprises two annular retaining disks 36, 35 the latter of which is held against axial movement by a nut 11a. The right-hand end portion of the clutch element 25 carries a friction-generating annular liner 31 which may consist of bronze or the like and can engage a complementary annular extension 39 of the clutch element 38 on the spindle 7b. The cooperating surfaces of the liner 31 and extension 39 are of conical outline.

The transmission ratio of gears 12, 13 is slightly different from the transmission ratio of the gears 32, 33. Thus, when the intermediate shaft 11 rotates in response to operation of the motor 8, the rotational speed of the output shaft 14 exceeds at least slightly the rotational speed of the clutch element 25 and of its liner 31.

The driving connection between the planet pinion 5 of FIG. 2 and the spindle 7b comprises a disk clutch 37 of any known design. The spindle 7b is compelled to share all angular displacements of the clutch element 38 even though the latter is free to move in the axial direction of the spindle. Such axial movements of the clutch element 38 are necessary because this element also serves as a means for selectively engaging or disengaging the spindle 7b from the clutch 37 and planet pinion 5. In other words, the arrangement is such that the clutch 37 is operative and drives the spindle 7b in response to rotation of the planet pinion 5 when the clutch element 38 is disengaged from the clutch element 25. The means for shifting the clutch element 38 axially of the spindle 7b comprises a roller 41 which may enter a circumferential groove 40 of the clutch element 38 when the carrier 6 is indexed to a position in which the axis of the spindle 7b coincides with the axis of the output shaft 14. The roller 41 is mounted at one end of a reciprocable clutching shaft 42 which is mounted in two stationary bearing brackets 51, 52 and is connected to a piston rod 43a fixed to a piston 43b which is reciprocable in a double-acting hydraulic or pneumatic cylinder 43. The cylinder 43 is fixed to the frame of the machine tool in a manner not shown in FIG. 2.

The left-hand end portion of the spindle 7a (as viewed in FIG. 1) carries a planet pinion 5, a disk clutch 37, a male clutch element 16, and a female clutch element 38. The distance between the axis of the spindle 7a and the fixed axis of the main shaft 3 is the same as that between the axes of the shaft 3 and spindle 7b so that, when the carrier 6 is indexed to another angular position, the axis of the spindle 7a will coincide with the axis of the shaft 14 and may be driven by the unit of FIG. 2. Regardless of the exact number of spindles in the carrier 6, each such spindle may be aligned with the output shaft 14 in the corresponding angular position of the carrier 6 which is rotated by indexing means of known design, not forming part of the present invention.

The driving arrangement of FIGS. 1 and 2 operates as follows:

When the carrier 6 is indexed to the angular position of FIG. 2, the axis of the work spindle 7b coincides with the axis of the output shaft 14, i.e., the spindle 7b registers with the output shaft. The spindle 7b is driven by the sun gear 4 (i.e., by the drive means which is common to all work spindles) through the planet pinion 5 because the disk clutch 37 is operative. The roller 41 has entered the circumferential groove 40 of the female element 38 of the friction clutch which is then in the position of FIG. 2 and couples the clutch 37 with the spindle 7b. In the next step, the right-hand chamber of the cylinder 43 receives a suitable fluid pressure medium and the left-hand chamber of this cylinder discharges an equal quantity of pressure medium. The valves which control the admission and evacuation of pressure medium from the cylinder 43 may be actuated by hand or automatically in response to indexing of the carrier 6. The cylinder 43 withdraws the piston rod 43a and moves the clutching shaft 42 in a direction to the left, as viewed in FIG. 2, whereby the roller 41 entrains the clutch element 38 and moves the extension 39 in engagement with the liner 31. This disengages the clutch 37 so that the planet pinion 5 may rotate with reference to the spindle 7b, and this spindle begins to rotate at the speed of the spur gear 32 which meshes with the driver gear 33. This driver gear 33 is rotated by the free-wheeling clutch 34 from the intermediate shaft 11 and motor 8. The speed at which the spindle 7b rotates in response to operation of the friction clutch 25, 38 is normally different from the speed at which the spindle 7b was driven by the planet pinion 5. The teeth 15a are still disengaged and rotate at a speed which is different from the speed of the male clutch element 16. This will be readily understood since the ratio of gears 32, 33 is different from the ratio of gears 12, 13. In the next step, the right-hand chamber of the cylinder 44 receives a pressure medium to rock the lever 22 in a clockwise direction, as viewed in FIG. 2, whereby the output shaft 14 is shifted in a direction to the right and moves the teeth 15a in engagement with the teeth of the clutch element 16. The valves which control the admission and evacuation of pressure medium from the chambers of the cylinder 44 may be actuated by hand or automatically in response to actuation of valves for the cylinder 43 but with a certain delay which is necessary to insure that the spindle 7b rotates first at the speed of the clutch element 25 and thereupon at the speed of the clutch element 15. The clutch element 15 is compelled to share all axial movements of the output shaft 14 and moves its teeth 15a in mesh with the teeth of the clutch element 15 as soon as the output shaft is shifted by the lever 22 and shifting member 19. The spindle 7b now rotates at the exact speed of the output shaft 14, and the clutch element 38 rotates the clutch element 25 at an increased speed so that the driver gear 33 rotates at a speed exceeding the speed of the intermediate shaft 11.

This is made possible by the provision of the free-wheeling clutch 34.

It will be noted that, save for the belts and pulleys 8a, the power train from the motor 8 to the spindle 7b comprises a series of elements which are in positive (not frictional) engagement with each other so that the spindle 7b may be driven at an exactly predetermined speed and may receive an exceptionally high driving torque. Modern types of belts and pulleys are fully capable of transmitting such torque without any slippage.

The change-speed gears 9, 10 may be replaced by a variable speed transmission 109 which is shown in FIG. 3. Alternatively, the change-speed gears 9, 10 may be omitted altogether if the motor 8 is replaced by a variable speed D.-C. motor 108 which is shown in FIG. 4. The intermediate shaft 11 is then driven directly by the belts and pulleys 8a. An important advantage of the driving units shown in FIGS. 3 and 4 is that the r.p.m. of the spindle 7b may be changed while the machine tool is in actual use. The motor 108 or the transmission 109 may be regulated automatically, for example, by a suitable potentiometer or another instrument. If such a machine tool is used for facing work, the tool or tools will remove cuttings at a constant speed.

In accordance with a further modification of my invention which is shown in FIG. 6, one of the clutch elements 15, 16 may be provided with a single tooth and the other clutch element is then provided with a single gap for the tooth. This insures that the output shaft 14 is in a predetermined angular position when it is coupled to the spindle 7b, or vice versa. Such synchronization is of importance when the machine tool performs a large number of operations which must be correlated with utmost precision.

It will be readily understood that the multiple-spindle automatic may be provided with two or more driving units of the type shown in FIGS. 2, 3 or 4. Thus, and as shown in FIG. 5, at least two spindles 207 may be driven by independent driving units. Assuming that the automatic comprises a total of five work spindles, as many as three spindles 207 may be driven by the main shaft 203, a fourth spindle 207 may be driven by the driving unit of FIGS. 2, 3 or 4, and a fifth spindle may be driven by a second driving unit whereby the second driving unit may but need not be identical with the first driving unit. In FIG. 5, the two driving units comprise variable speed transmissions 209a, 209b which are driven by a constant speed motor 208. The other reference numerals shown in FIG. 5 correspond to those used in FIGS. 1 and 2 but each preceded by the digit "2."

It was found that, even when the automatic is used for very complicated work, it suffices to provide a maximum of three driving units which may but need not be driven by a common motor.

A very important advantage of my driving arrangement is that each spindle must carry a minimum of parts. In the illustrated embodiments, each of the spindles 7a, 7b or 207 must carry only a single planet pinion 5 or 205, a clutch 37, and the clutch elements 16, 38. Consequently, the spindles may be rather short which contributes to stiffness and allows for transmission of higher torques. The speeds at which each of the spindles 7a, 7b or 207 may be driven from the motor 8, 108 or 208 can be selected independently of the speed at which the spindles are driven from the motor 1. Also, the driving unit or units occupy little room so that the automatic is readily accessible which is particularly important in the embodiment of FIG. 1 wherein the operators must have access to the change-speed gears 9, 10 whenever it becomes necessary to change the rotational speed of the output shaft 14.

Since the motor 1 need not drive the spindles at different speeds, and since this motor may be utilized to drive the spindles at a relatively low speed, the driving connection between the motor 1 and spindles 7a, 7b, 207 may be of lightweight construction. Any desired higher rotational speeds may be transmitted by one or more driving units. The friction clutch 25, 38 is utilized mainly to insure satisfactory engagement of clutch elements 15, 16 so that it need not transmit significant torque. Any higher torque will be transmitted through the clutch 15, 16. It is further to be noted that the improved driving arrangement is of considerable advantage if the motor 8, 108 or 208 is used to drive the spindles 7a, 7b or 207 at the same speed as the motor 1. Thus, the motor 1 will be used to drive the spindles when the latter offer little resistance to such rotation, and the motor 8, 108 or 208 will be used to drive the spindles at the same speed when the spindles offer very high resistance to rotation, i.e., at the time the work held in the chucks 7c is in actual engagement with one or more tools. However, and as a rule, the driving unit or units will be used to drive the corresponding spindle or spindles at two or more different speeds one of which may but need not be the same as the speed transmitted by the planet pinions 5 or 205.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a multiple-spindle machine tool, in combination, a frame; an indexible carrier mounted in said frame to rotate about a first axis; a spindle mounted in said carrier to rotate about a second axis parallel to said first axis; drive means for rotating said spindle about said second axis and comprising meshing gears mounted for rotation about said first and second axes; releasable first clutch means for normally coupling said spindle to said drive means; and a driving unit for rotating the spindle about said second axis independently of said drive means, said driving unit comprising an intermediate shaft parallel with said spindle, means for rotating said intermediate shaft at different speeds, a first driver gear on said intermediate shaft, an axially reciprocable output shaft arranged to rotate about a third axis which coincides with said second axis in a predetermined angular position of said carrier, a driven gear mounted on said output shaft and meshing with said driver gear, a pair of toothed clutch elements respectively provided on said spindle and on said output shaft and arranged to mesh in response to axial movement of said output shaft toward said spindle in said predetermined position of the carrier, shifting means for moving said output shaft axially toward and away from said spindle so as to respectively connect and disengage the output shaft from said spindle, disengaging means for releasing said first clutch means in said predetermined position of the carrier, a friction clutch including a first clutch element rotatable about said third axis and a second clutch element mounted for rotation on and reciprocable axially with reference to said spindle, a second driver gear rotatably mounted on said intermediate shaft, free-wheeling clutch means drivingly connecting said intermediate shaft with said second driver gear in such a manner that the second driver gear is free to rotate independently when its rotational speed exceeds the rotational speed of said intermediate shaft, a further gear provided on said first clutch element and meshing with said second driver gear to rotate said first clutch element, and means for reciprocating the second clutch element of said friction clutch axially of said spindle to move said second clutch element into and out of engagement with said first clutch element.

2. A structure as set forth in claim 1, wherein the second clutch element of said friction clutch constitutes a component part of said disengaging means whereby said first clutch means is automatically released in response to engagement of said second clutch element with said first clutch element.

3. A structure as set forth in claim 1, wherein the transmission ratio of said first driver gear and said driven gear is higher than the transmission ratio of said second driver gear and said further gear whereby the rotational speed of said output shaft exceeds the rotational speed of said first clutch element so that said second driving gear rotates with reference to said intermediate shaft when said output shaft drives said spindle.

4. A structure as set forth in claim 1, wherein the clutch elements of said friction clutch are provided with cooperating conical surfaces and wherein the second clutch element of said friction clutch is provided with a circumferential groove, said means for reciprocating the second clutch element of said friction clutch axially of said spindle comprising a roller having a portion extending into said groove when the carrier is indexed to said predetermined position and means for moving said roller in the axial direction of said spindle.

5. A structure as set forth in claim 4, wherein the means for moving said roller in the axial direction of said spindle comprises a double-acting fluid-operated cylinder.

6. In a multiple-spindle machine tool, in combination, a frame; an indexible carrier mounted in said frame to rotate about a first axis; a spindle mounted in said carrier to rotate about a second axis parallel to said first axis; drive means for rotating said spindle about said second axis and comprising meshing gears mounted for rotation about said first and second axes; releasable first clutch means for normally coupling said spindle to said drive means; and a driving unit for rotating the spindle about said second axis independently of said drive means, said driving unit comprising an intermediate shaft parallel with said spindle, means for rotating said intermediate shaft at different speeds, a driver gear on said intermediate shaft, an axially reciprocable output shaft arranged to rotate about a third axis which coincides with said second axis in a predetermined angular position of said carrier, a driven gear mounted on said output shaft and meshing with said driver gear, a pair of toothed clutch elements respectively provided on said spindle and on said output shaft and arranged to mesh in response to axial movement of said output shaft toward said spindle in said predetermined position of the carrier, shifting means comprising a double-acting fluid-operated cylinder and a tubular shifting member operatively connected with said cylinder, for moving said output shaft axially toward and away from said spindle so as to respectively connect and disengage the output shaft from said spindle, said shifting member being non-rotatably secured to said frame and said shifting means further comprising devices connecting said shifting member with said output shaft so that the output shaft is free to rotate with but is held against axial movement with reference to said shifting member, and disengaging means for releasing said first clutch means in said predetermined position of the carrier.

7. A structure as set forth in claim 1, wherein said drive means further comprises means for rotating said spindle at at least one predetermined speed and wherein such predetermined speed is substantially the same as one of the speeds at which the spindle can be rotated by said driving unit.

8. A structure as set forth in claim 1, wherein said drive means further comprises means for rotating said spindle at at least one predetermined speed and wherein such predetermined speed is different from each speed at which the spindle can be rotated by said driving unit.

9. A structure as set forth in claim 1, wherein said drive means comprises means for rotating said spindle at a plurality of predetermined speeds and wherein at least one of said predetermined speeds is different from the speeds at which the spindle can be rotated by said driving unit.

10. A structure as set forth in claim 6, wherein said drive means further comprises means for rotating said spindle at at least one predetermined speed which is different from the speeds at which the spindle can be rotated by said driving unit.

11. A structure as set forth in claim 6, wherein said drive means further comprises means for rotating said spindle at at least one predetermined speed which is the same as one of the speeds at which the spindle can be rotated by said driving unit.

12. A structure as set forth in claim 6, wherein said drive means further comprises means for rotating said spindle at a plurality of predetermined speeds and wherein at least one of said predetermined speeds is different from the speeds at which the spindle can be rotated by said driving unit.

References Cited by the Examiner

UNITED STATES PATENTS

| | | | |
|---|---|---|---|
| 1,895,079 | 1/1933 | Lewis | 29—38 |
| 1,911,632 | 5/1933 | Lewis | 29—38 |
| 2,140,019 | 12/1938 | Lewis | 82—28 X |
| 2,876,527 | 3/1959 | Matlachowsky | 82—29 X |
| 2,960,203 | 11/1960 | Sylla | 82—29 X |
| 3,081,523 | 3/1963 | Retz | 82—28 X |

ANDREW R. JUHASZ, *Primary Examiner.*

LEONIDAS VLACHOS, *Examiner.*